(12) United States Patent
Takahashi

(10) Patent No.: US 12,091,621 B2
(45) Date of Patent: Sep. 17, 2024

(54) BIO-MULTI-REACTOR HYDROGEN GENERATION METHOD AND SYSTEM

(71) Applicant: Kozon Takahashi, Sosa (JP)

(72) Inventor: Kozon Takahashi, Sosa (JP)

( * ) Notice: Subject to any disclaimer, the term of this patent is extended or adjusted under 35 U.S.C. 154(b) by 0 days.

(21) Appl. No.: 18/476,492

(22) Filed: Sep. 28, 2023

(65) Prior Publication Data

US 2024/0117258 A1 Apr. 11, 2024

(30) Foreign Application Priority Data

Oct. 7, 2022 (JP) .................................. 2022-162153

(51) Int. Cl.
*C10J 3/66* (2006.01)
*C01B 3/16* (2006.01)

(52) U.S. Cl.
CPC .................. *C10J 3/66* (2013.01); *C01B 3/16* (2013.01); *C10J 2300/0916* (2013.01); *C10J 2300/0933* (2013.01)

(58) Field of Classification Search
CPC .................. C10J 3/66; C10J 2300/0916; C10J 2300/0933; C01B 3/16
See application file for complete search history.

(56) References Cited

U.S. PATENT DOCUMENTS

| | | | |
|---|---|---|---|
| 4,422,858 A | 12/1983 | Weber et al. | |
| 8,540,898 B2 | 9/2013 | Saito | |
| 2019/0002776 A1* | 1/2019 | Matsushita | ................ C10J 3/76 |

FOREIGN PATENT DOCUMENTS

| | | |
|---|---|---|
| EP | 0 444 987 B1 | 8/1993 |
| EP | 2 505 261 A1 | 10/2012 |

(Continued)

OTHER PUBLICATIONS

Kenjo, "About methane, a compound that is a natural gas resource as well as a greenhouse gas", Jan. 2019, with partial English translation, from internet site "Information on Power and Environment" [https://denki.k-server.info/] [https://denki.k-server.info/methane/].

Fuji Furukawa E & C Co. Ltc., "Construction of non-engine power generation and regional utilization system by charcoal water gas using weeded-out trees as material", presented in an Achievement Report Meeting held on Mar. 11, 2015 for "Local Eco-system Technology Development and Demonstration Project—Fiscal Year 2014", with partial English translation.

(Continued)

*Primary Examiner* — Anthony J Zimmer
*Assistant Examiner* — Syed T Iqbal
(74) *Attorney, Agent, or Firm* — Myers Wolin, LLC

(57) ABSTRACT

A bio-multi-reactor hydrogen generation method using a bio-multi-reactor hydrogen generation system including a plurality of carbonization-water gasification furnaces and a plurality of heating furnaces arranged alternately side by side includes: arranging solid combustibles in each carbonization-water gasification furnace; dry distilling the solid combustibles by heating from each heating furnace adjacent to each carbonization-water gasification furnace; gasifying carbide obtained by dry distillation within each carbonization-water gasification furnace by supplying steam to the carbide to cause a water gasification reaction to take place; and maintaining each heating furnace at a temperature for dry distilling the solid combustibles in each carbonization-water gasification furnace by collecting a combustible gas generated in dry distillation of the solid combustibles in each carbonization-water gasification furnace in a tank and supplying the combustible gas to each heating furnace for combustion.

10 Claims, 4 Drawing Sheets

(56) References Cited

FOREIGN PATENT DOCUMENTS

| | | |
|---|---|---|
| EP | 2 455 336 B1 | 4/2018 |
| JP | S57-74391 A | 5/1982 |
| JP | S60-123592 A | 7/1985 |
| JP | H03-242301 A | 10/1991 |
| JP | 2869525 B2 | 3/1999 |
| JP | 2870929 B2 | 3/1999 |
| JP | 2910283 B2 | 6/1999 |
| JP | 2004-182501 A | 7/2004 |
| JP | 3649456 B2 | 5/2005 |
| JP | 2009-13320 A | 1/2009 |
| JP | WO2011/007493 A1 | 12/2012 |
| JP | WO2011/065194 A1 | 4/2013 |
| JP | 2019-178230 A | 10/2019 |
| JP | 2019-214023 A | 12/2019 |
| JP | 7089809 B2 | 6/2022 |

OTHER PUBLICATIONS

Morita, "Basis on Reaction of Coal Gasification", Waseda University, Coal Chemistry Special Topics, Journal of the Fuel Society of Japan, vol. 58, No. 622, 1979, with English synopsis.

Kiichiro Ogawa, "Gas Turbine Technology", Gas Turbine Society of Japan, The Institute of Applied Energy, Mar. 2007, with partial English translation.

Ohyama, "Evaluation of Catalytic Hydrogenation of Carbon Dioxide to Methanol", Central Research Institute of Electric Power Industry, Journal of the Japan Institute of Energy, vol. 74, No. 3, 1995, with English synopsis.

Notice of Reasons for Refusal issued by the Japan Patent Office for corresponding Japanese Patent Application No. 2022-162153, mailed on Jan. 5, 2023, with an English translation.

* cited by examiner

BIO-MULTI-REACTOR HYDROGEN GENERATION METHOD AND SYSTEM

CROSS-REFERENCE TO RELATED APPLICATION

This application is based upon and claims the benefit of priority of the prior Japanese Patent Application No. 2022-162153, filed on Oct. 7, 2022, now granted as Japanese patent No. 7251858, the entire contents of which are incorporated herein by reference.

FIELD

The embodiment discussed herein relates to a bio-multi-reactor hydrogen generation method and system of generating hydrogen through multiple reactors from solid combustibles such as biomass and coal.

BACKGROUND

The following technologies are known.
PTL1: Japanese Patent No. 2870929 "Integrated Coal Gasification Combined Cycle Plant"
PTL2: Japanese Patent No. 2910283 "Integrated Coal Gasification Combined Cycle Apparatus"
PTL3: Japanese Patent No. 3649546 "Coal Gasification Power Generation Method"
PTL4: Re-publication of PCT International publication No. WO2011/007493 "Hydrogen Production Method and Hydrogen Production System"
PTL5: Japanese Laid-open Patent Publication No. 2004-182501 "Method of Producing Hydrogen from Biomass"
PTL6: Japanese Patent No. 2869525 "Method and Apparatus for Removing Carbon Monoxide in Reformed Gas"
PTL7: Japanese Laid-open Patent Publication No. 03-242301 "Hydrogen Production Method"
PTL8: Japanese Laid-open Patent Publication No. 2009-013320 "Hydrogen Production Method"
PTL9: Japanese Laid-open Patent Publication No. 57-74391 "Coke Gasification Method"
PTL10: Japanese Laid-open Patent Publication No. 60-123592 "Gasification Method of Coal and Coke in Coke Production Factory"
PTL11: Japanese Laid-open Patent Publication No. 2019-178230 "Gasification Furnace System"
PTL12: Japanese Patent No. 7089809 "Multi-Reactor Hydrogen Generation Method"
PTL13: Japanese Laid-open Patent Publication No. 2019-214023 "Production Method of Water Gas Shift Reaction Catalyst, Water Gas Shift Reaction Catalyst, and Production Method of Hydrogen"
PTL14: Re-publication of PCT International publication No. WO2011/065194 "Reverse Shift Reaction Catalyst and Production Method of Synthesis Gas using Reverse Shift Reaction Catalyst"
NPTL1: "About methane, a compound that is a natural gas resource as well as a greenhouse gas", Information on Power and Environment, Jan. 11, 2019
NPTL2: FUJI FURUKAWA E&C CO. LTD., "Construction of non-engine power generation and regional utilization system by charcoal water gas using weeded-out trees as material"
NPTL3: Yoshiro Morita, Waseda University, Coal Chemistry Special Topics "Basis on Reaction of Coal Gasification", Journal of the Fuel Society of Japan, Vol. 58, No. 622, 1979
NPTL4: The Institute of Applied Energy, "Gas Turbine Technology", March, 2007
NPTL5: Seiichi Ohyama, Central Research Institute of Electric Power Industry, "Evaluation of Catalytic Hydrogenation of Carbon Dioxide to Methanol", Journal of the Japan Institute of Energy, Vol. 74, No. 3, 1995

SUMMARY

In one aspect, there is provided a bio-multi-reactor hydrogen generation method using a bio-multi-reactor hydrogen generation apparatus including a plurality of carbonization-water gasification furnaces and a plurality of heating furnaces arranged alternately side by side, the method including: arranging solid combustibles in each of the carbonization-water gasification furnaces; dry distilling the solid combustibles by heating from each of the heating furnaces adjacent to each of the carbonization-water gasification furnaces; gasifying carbide obtained by dry distillation within each of the carbonization-water gasification furnaces by supplying steam to the carbide to cause a water gasification reaction to take place; and maintaining each of the heating furnaces at a temperature for dry distilling the solid combustibles in each of the carbonization-water gasification furnaces by collecting a combustible gas generated in the dry distilling of the solid combustibles in each of the carbonization-water gasification furnaces in a tank and supplying the combustible gas to each of the heating furnaces for combustion.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

DESCRIPTION OF EMBODIMENT(S)

Figure 1:
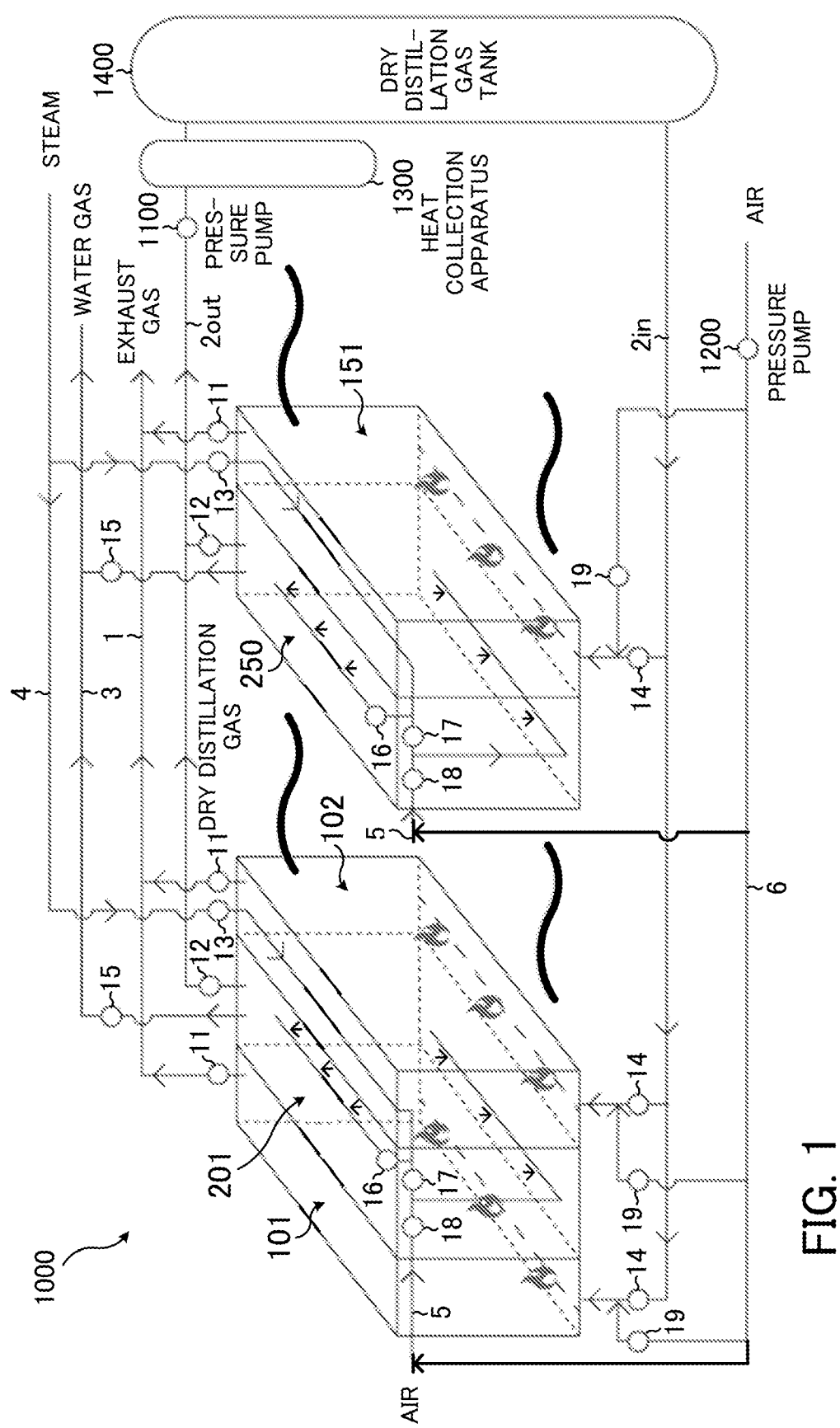
FIG. 1 is an explanatory diagram of a bio-multi-reactor hydrogen generation system.

As a method of performing high-efficiency power generation by efficiently gasifying coal, there is Integrated Coal Gasification Combined Cycle (IGCC) (PTL1, PTL2, PTL3).

As fuel of internal combustion engines and material of chemical products, and for power generation, iron manufacture and the like, there is an increasing demand for hydrogen. However, production methods of hydrogen are mainly high-temperature decomposition of methane gas and electrolysis of water, and therefore, the cost is high. Methane gas is a fossil fuel, and therefore, is a compound that is the source of generating carbon oxide and is also a compound that causes global warming effects 25 times in magnitude that of carbon dioxide (NPTL1). That is, the methane gas is a greenhouse gas. Consequently, a method has also been studied in which high-temperature steam decomposition of biomass and coal is performed in one stage or two stages. However, with this method, there are many types of generated gas, entailing performing an additional process to oxidize the gas to carbon dioxide. Further, when even a small amount of sulfur compound or nitrogen compound is included in biomass or coal, it oxidizes to sulfur oxide or nitrogen oxide through gasification, and therefore, an apparatus to remove the oxide is needed. A separation process of sulfur oxide and nitrogen oxide is complicated and the cost is raised. With the bio-multi-reactor hydrogen generation method and system of the present application (the present bio-multi-reactor hydrogen generation method and system), the amount of processing of gas refinement is considerably reduced.

PTL4 describes a method and system of producing hydrogen from low-quality coal. However, with the method of PTL4, after gasification of low-quality coal or biomass by steam, carbon monoxide is further subjected to a shift reaction with steam to generate carbon dioxide and hydrogen gas. In addition, the remining carbon monoxide is oxidized to carbon dioxide with oxygen by using a catalyst after cooling the reaction gas. Consequently, producing hydrogen undergoes processes in several stages. Further, in order to raise the temperature of gasification to 1,000° C. or higher, oxygen obtaining by air being subjected to cryogenic separation is used, and therefore, the cost is further raised. Furthermore, there is no description of any apparatus to remove sulfur oxide and nitrogen oxide included in coal or biomass. Consequently, with the method of PTL4, even if low-quality coal is used, it is predicted that the unit price of hydrogen production is not reduced. Despite the above, the recent situation of the technology of hydrogen production and processing of carbon dioxide has been well investigated in PTL4. Further, PTL4 also describes a method of separating hydrogen from carbon dioxide in detail. Depending on the use of the obtained water gas, there is a possibility that the separation method as described in PTL4 is also incorporated in the present bio-multi-reactor hydrogen generation method and system when separating hydrogen from carbon oxide is needed.

PTL1 describes the air-blowing coal gasification technology of Integrated Coal Gasification Combined Cycle; IGCC) Plant. In PTL1, carbon monoxide in the water gas generated from coal is subjected to a shift reaction into carbon dioxide and the carbon dioxide is removed and thus the combustion stability of gas turbine power generation is improved. However, there is a possibility that such a problem persists that the gas turbine output is reduced by an amount corresponding to the amount of removed carbon dioxide.

PTL2 describes the oxygen-blowing coal gasification technology of Integrated Coal Gasification Combined Cycle (IGCC) Plant.

PTL3 and PTL11 describe the improvement of Integrated Coal Gasification Combined Cycle (IGCC) Plant.

Each Integrated Coal Gasification Combined Cycle (IGCC) Plant described above is an apparatus that gasifies material in one stage and oxidizes carbon monoxide to carbon dioxide before utilizing the gas, and therefore, several apparatuses for desulfurization, denitration and the like are also needed.

NPTL2 describes the construction of the non-engine power generation and regional utilization system by generating water gas from charcoal using trees that have been weeded out (in the following, described as "weeded-out trees) as material. However, with the method of NPTL2, after weeded-out trees are charcoalized, the charcoal is moved to another apparatus and heating and generation of water gas are performed in one stage, and therefore, the generation of carbon monoxide is inevitable. Consequently, a reaction apparatus for oxidizing carbon monoxide to carbon dioxide is needed. Further, when charcoalizing weeded-out trees, normally the heat at the time of heating and combustible gas are discharged into the atmosphere, and therefore, several tens of percent of energy of the weeded-out trees are lost. With the present biomass-multi-reactor hydrogen generation method and system, it is possible to utilize most of the energy of weeded-out trees with a slight energy loss.

As fuel of internal combustion engines and material of chemical products, and for power generation, iron manufacture and the like, hydrogen is utilized in a variety of fields. The cost of producing hydrogen by electrolysis of water or decomposition of methane gas is high and this is a social problem. The use of coal or petroleum leads to carbon dioxide emissions, and this is a world problem. Utilization of biomass (mainly bamboo and trees) and tree-planting do not lead to carbon dioxide emissions. If cut appropriately, bamboo sprouts and grows up for itself and it is possible to cut and use bamboo in three years, and therefore, reproduction is very easy and almost no human work is needed. There are many bamboo forests that are not utilized. With the present biomass-multi-reactor hydrogen generation method and system, it is possible to utilize bamboo even ten meters long, and therefore, the cost of the production of hydrogen is reduced.

PTL7 teaches that oxygen, steam and the like are made to act on coal, fuel oil and the like at a high temperature under high pressure, and the generated gas is subjected to a water gas shift reaction at 400° C. by using an iron oxide-chromium oxide catalyst, and then, the obtained gas is inserted under pressure into the deep sea to dissolve carbon dioxide and separate hydrogen. However, depending on the use, oxidation to carbon dioxide and separation of carbon dioxide are not needed. PTL13 describes a method of producing a water gas shift reaction catalyst, a water gas shift reaction catalyst, and a method of producing hydrogen. PTL14 describes a reverse shift reaction catalyst and a method of producing a synthesis gas using the reverse shift reaction catalyst.

PTL8 teaches that using potassium carbonate as a catalyst enables steam gasification even for low-quality coal at 650° C. or less, that is, water gasification is enabled.

NPTL3 describes pyrolysis of coal and a reaction with steam (that is, water gasification reaction), a catalyst, and further, chemical reactions of an entrained-bed gasification method and an in-furnace desulfurization gasification method.

NPTL4 teaches that even a gas having a low calorific value may also be used for an IGCC gas turbine.

NPTL5 teaches that the equilibrium conversion rate is higher with carbon monoxide than with carbon dioxide in methane synthesis.

Gasification of biomass and coal by steam has been discussed and part of it has been put to practical use, but it is obliged to use a number of apparatuses in order to produce high-purity hydrogen (PTL1, PTL2, PTL3, PTL11). As a method of producing hydrogen by gasification of biomass, there is a method as described in PTL5. In Integrated Coal Gasification Combined Cycle, importance is given to continuous operation and gasification is performed in one stage and a number of types of compound is generated, and therefore, a number of apparatuses is needed for gas refinement and purification of hydrogen. Further, with the related continuous gasification method, when abnormality, such as abnormal reaction, pipe clogging, and abnormal heating, occurs in part of the apparatus, control for the stable operation is likely to become difficult and at the worst, the operation is obliged to stop.

By utilizing a plurality of batch reactors, it is possible to continuously generate a predetermined amount of hydrogen. As this method, a method is known in which coke is moved from the coke furnace of an ironworks to a cooling apparatus and part of the coke is water gasified by supplying oxygen or air and water and the coke is further moved to a reaction chamber and water gasified with oxygen or air and steam (PTL9). A method is also known in which coke is moved from the coke furnace of an ironworks to a cooling apparatus and the coke is water gasified by supplying oxygen or air and water (PTL10). In contrast to this, the present applicant has filed the multi-reactor hydrogen generation method (PTL12), which is a water gasification method of solid combustibles having high thermal efficiency and obviating any additional apparatus by gasifying coke in a carbonization furnace without moving the coke from the furnace. However, it is preferable to make an attempt to reduce cost for further facilitating the utilization of hydrogen.

In the present bio-multi-reactor hydrogen generation method and system also, the water gasification reaction is performed after intentionally performing dry distillation for biomass and coal in order to make it easy to remove impurities, such as sulfur compounds and nitrogen oxide. Further, in order to considerably improve the thermal efficiency, a plurality of heating furnaces and a plurality of carbonization-water gasification furnaces are combined so as to be arranged alternately side by side. Exhaust gas treatment is needed to be performed only for the gas, which is the combusted dry distillation gas. Further, it is possible to generate hydrogen by filling the carbonization-water gasification furnace with or arranging large solid combustibles, such as bamboo and logs, and small solid combustibles, such as sawdust therein, and therefore, it is also possible to utilize biomass that is left as industrial waste and weeded-out trees left in mountains and forests as resources.

In addition, with the present bio-multi-reactor hydrogen generation method and system, by utilizing a plurality of batch reactors, it is possible to continuously generate a predetermined amount of hydrogen. Consequently, until hydrogen is collected, the plurality of apparatuses operates, and therefore, even when abnormality occurs, such as abnormal reaction, pipe clogging, and abnormal heating, it is sufficient to disconnect and repair the apparatus having caused the abnormality. Because of this, with the present bio-multi-reactor hydrogen generation method and system, it is easy to perform the stable operation. Further, with the present bio-multi-reactor hydrogen generation method and system, the gas components before the refinement of hydrogen into high-purity hydrogen are only carbon monoxide, carbon dioxide, excessive steam, and hydrogen, and therefore, refinement is easy. Consequently, the present bio-multi-reactor hydrogen generation method and system are the method and system in which part of the refinement process of the related system of generating hydrogen by gasification is already incorporated.

Further, Integrated Coal Gasification Combined Cycle, the hydrogen engine and the like each employ a method that utilizes high-purity hydrogen. However, it has turned out that the gas turbine operates even with a gas including carbon monoxide and carbon dioxide and having a low hydrogen purity and an output equivalent to the heat of combustion is obtained (PTL1, NPTL4). Further, it has also turned out that the supply of a mixture of coal and a catalyst (potassium carbonate) together with steam and hot wind causes gasification to advance fast, as compared with the case where no catalyst is mixed (PTL8). Consequently, in the present bio-multi-reactor hydrogen generation method and system, by filling the carbonization-water gasification furnaces with or arranging a water gasification catalyst together with biomass and coal therein, it is possible to make an attempt to reduce the time of water gasification after carbonization, improve the production efficiency of the water gas, and reduce the cost of hydrogen production. That is, the gas including carbon monoxide and carbon dioxide and having a low hydrogen purity is supplied to the next apparatus as it is.

Further, as regards the gas turbine technology, PTL1 (page 2) teaches that it is possible to obtain a turbine output equivalent to a calorific value even from the hydrogen gas including carbon dioxide. The combustible component of the gas generated from the blast furnace of an ironworks is mainly carbon monoxide and there are many incombustible components, such as nitrogen and carbon dioxide, and therefore, the calorific value per unit volume is about one-tenth that of methane of the natural gas, but the gas turbine power generation has been put to practical use (NPTL4). Consequently, without the need to separate carbon monoxide in the water gas by oxidizing the carbon monoxide to carbon dioxide, it is possible to rotate the gas turbine with hydrogen as it is including carbon monoxide and carbon dioxide and utilize the hydrogen for power generation and others.

That is, as a method with high thermal efficiency, the present bio-multi-reactor hydrogen generation system is utilized, which has a plurality of combinations of a heating furnace and a water gasification furnace adjacent to each other. With heat at 1,000° C. or higher from the heating furnaces on both sides, biomass and coal, or biomass and coal with a water gasification catalyst existing together within the carbonization-water gasification furnace are heated for several hours or more and volatile matter is separated almost 100%. Then, carbide including almost 100% of the carbon component, or carbide and the catalyst remain, and therefore, as a reaction in the second stage, high-temperature steam is supplied and a water gasification reaction is caused to take place. Then, carbon monoxide, carbon dioxide, and hydrogen are generated and the excessive steam remains as a $H_2O$ (hydrogen oxide) gas. In addition to that, a small amount of ash of biomass and coal remains. Then, in the presence of a catalyst, the water gasification reaction advances in a shorter time than that in a case where there is no catalyst. Further, when it is desired to reduce carbon monoxide, steam is supplied excessively to reduce carbon monoxide and increase carbon dioxide. As the water gasification catalyst, there are transition metals, such as nickel and iron, in addition to basic substances, such as lime, dolomite, magnesia, sodium carbonate, and potassium carbonate (NPTL3).

By filling the pipe connected to the furnace and the main pipe for water gas collection with or arranging the shift reaction catalyst therein, or by installing a breathable container at the uppermost portion of the furnace and filling the container with or arranging the shift reaction catalyst therein, the amount of carbon monoxide is very small depending on conditions. After that, it is possible to easily remove carbon dioxide and obtain a high-purity hydrogen gas. As the shift reaction catalyst, in addition to an iron oxide-chromium oxide catalyst (PTL7), a molybdenum-rhodium catalyst has been developed as a catalyst having a small reduction in catalyst activity even though sulfur compounds are included (PTL13).

shift reaction: $CO+H_2O=CO_2+H_2-9.8$ kcal (exothermic)

As the reverse shift reaction catalyst, an alkali-earth metal-transition metal catalyst has been developed (PTL14).

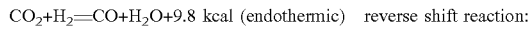
reverse shift reaction: $CO_2+H_2=CO+H_2O+9.8$ kcal (endothermic)

In the present bio-multi-reactor hydrogen generation method and system, by further installing steam blowing pipes or the like in two or more upper and lower rows in the carbonization-water gasification furnace, it is made possible to prevent soot, tar and the like having stuck to the furnace wall and the like, which are generated during the dry distillation of solid combustibles (biomass and coal), from remaining within the apparatus by water gasifying them. Generally, when solid combustibles are heated and volatile matter is vaporized, there are many cases where high-boiling point tar and the like stick to the discharge portion or the pipe. Consequently, high-temperature steam is injected under pressure to perform water gasification and the production rate of hydrogen is increased.

In the present bio-multi-reactor hydrogen generation method and system, a pipe is further connected so that it is possible to send air into a steam blowing pipe and the like. That is, during the normal operation, it is possible to perform the operation sufficiently by heating from the heating furnaces on both side, but when the temperature of the furnace drops considerably below 400 to 500° C. due to the endothermic reaction at the time of the generation of water gas, air is blown to combust carbide and the temperature within the furnace is raised. Then, an attempt is made to cause the water gasification reaction to advance easily. However, when a water gasification catalyst is caused to coexist, the reaction advances even at lower temperatures, and therefore, the blowing of air may be almost obviated.

During the operation, biomass and coal are heated close to 1,000° C., the combustible gas is separated and combusted, and used as the heat source of the heating furnace. It is already known that water gas is generated by supplying excessive high-temperature steam to biomass and coal sufficiently carbonized (NPTL3). When steam is caused to exist excessively, carbon monoxide is oxidized to carbon dioxide and a more amount of hydrogen is obtained as a result. In the related art, a large amount of highly reactive carbon monoxide is generated and methanol is synthesized. At present, a larger amount of high-purity hydrogen is demanded than ever, and therefore, the method is selected in which carbon monoxide is oxidized to carbon dioxide to generate more hydrogen and the carbon dioxide is removed. Consequently, the present applicant has filed the above-described multi-reactor hydrogen generation method (PTL12).

However, through a further examination, it has turned out that even the water gas generated from solid combustibles enables gas turbine power generation, and when biomass is utilized as solid combustibles, carbon dioxide does not need to be removed, and therefore, improving the production efficiency of water gas will lead to a further reduction in cost, and based on these findings, the present bio-multi-reactor hydrogen generation method and system have been made. In the present bio-multi-reactor hydrogen generation method and system, instead of oxidizing all carbide to carbon dioxide (PTL12), the carbide is water gasified and the generated water gas is utilized as it is with carbon monoxide being contained. Then, as in the above-described multi-reactor hydrogen generation method (PTL12), by arranging the carbonization-water gasification furnaces and the heating furnaces alternately side by side, it is possible to improve the thermal efficiency considerably. Then, it is also possible to increase carbon dioxide by filling the top of the furnace or the pipe on the top of the furnace with or arranging the shift reaction catalysis therein as needed and controlling the steam supply condition and the like. Further, by filling the top of the furnace or the pipe on the top of the furnace with or arranging the reverse shift catalyst therein, it is possible generate carbon monoxide and hydrogen gas. It may be possible to change the operation condition in accordance with the use thereafter. In methanol synthesis, the reaction yield is higher with carbon monoxide.

Figure 4:
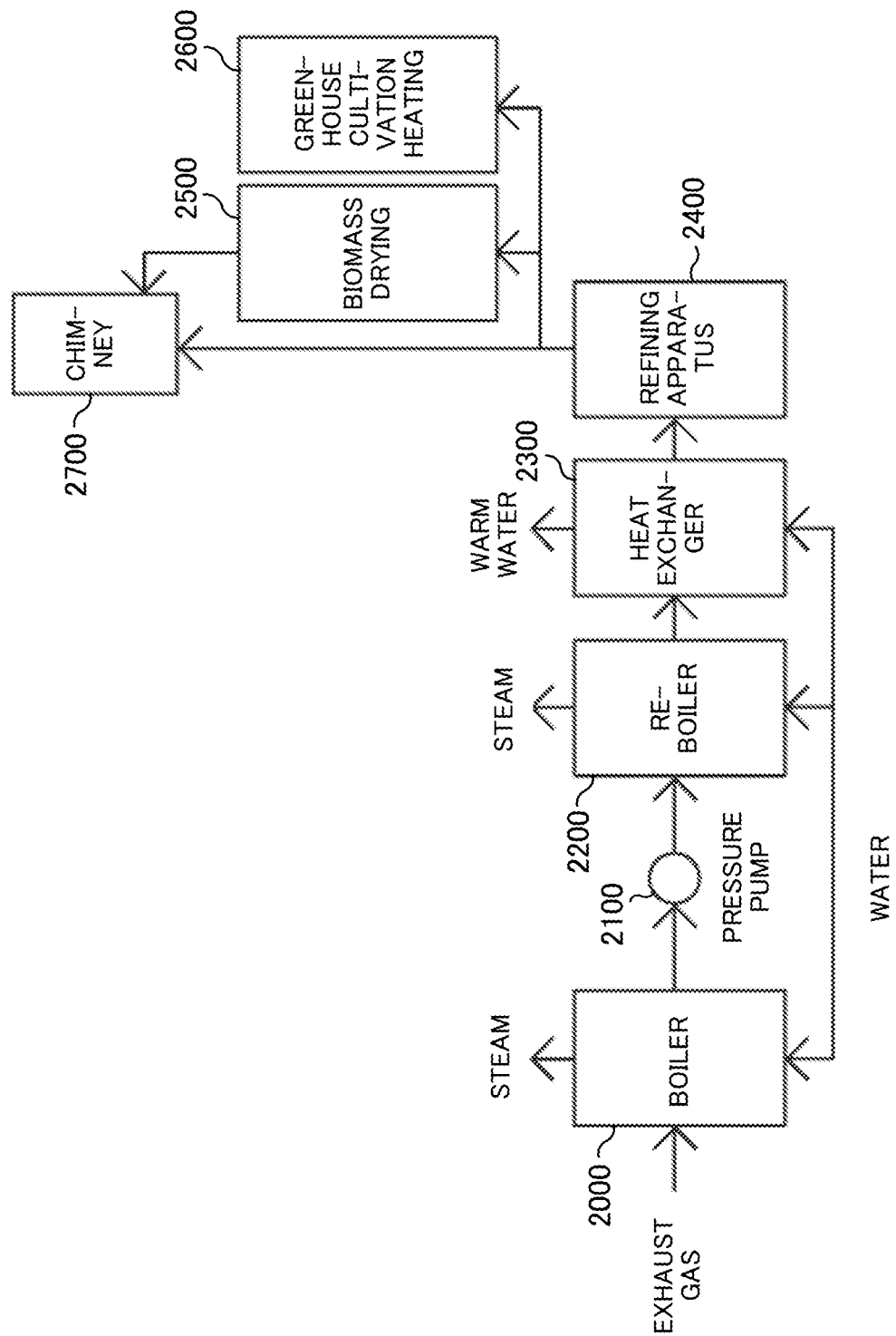
FIG. 4 is an explanatory diagram of heat collection and effective utilization of combustion exhaust gas from a heating furnace.

A method of effectively utilizing the heat of the high-temperature exhaust gas in the heating furnace is depicted in FIG. 4. The temperature of the exhaust gas of the heating furnace is 1,000° C. or higher, and therefore, high-temperature steam is generated by a heat collector of the type, such as a boiler 2000, and power generation by a steam turbine generator is performed. It may be possible to utilize the discharged steam as another heating resource within the factory. Further, it is possible to utilize the exhaust gas discharged from the boiler 2000 as a heat source within the factory by applying pressure to the exhaust gas by a pressure pump 2100 and collecting heat by a heat exchanger of the type, such as a reboiler 2200. Further, it may be possible to perform heat collection by a heat exchange 2300 once again or more. Then, it is possible to utilize the heat that is collected as the heat source of biomass drying 2500 and greenhouse cultivation heating 2600 through refining apparatus 2400 even if the temperature thereof drops to about 100° C. The exhaust gas is discharged from a chimney 2700. If the system is combined appropriately, there are many effective uses of heat. Even for greenhouse cultivation, if heat is generated single-handedly, the cost of petroleum will increase.

If biomass is used while taking into consideration a reduction in carbon dioxide, an increase in carbon dioxide emissions is not caused. In Japan, many trees are cut down and left as they are in forests. Consequently, the present bio-multi-reactor hydrogen generation method and system may also contribute to the measures to suppress the generation of carbon dioxide.

In the following, by using the attached drawings, an embodiment of the present bio-multi-reactor hydrogen generation method and system is described.

With reference to FIG. 1, the present bio-multi-reactor hydrogen generation method and system are described.

A bio-multi-reactor hydrogen generation system 1000 depicted in FIG. 1 includes carbonization-water gasification furnaces 201 to 250, . . . and heating furnaces 101, 102 to 151, . . . . The bio-multi-reactor hydrogen generation system 1000 includes pressure pumps 1100 and 1200, a heat collection apparatus 1300, and a dry distillation gas tank 1400.

The bio-multi-reactor hydrogen generation system 1000 includes a pipe 1 for collecting the exhaust gas after the dry distillation gas or the combustible gas is combusted in the heating furnaces 101, 102 to 151, . . . , a pipe (dry distillation gas collection pipe) 2out for collecting the dry distillation gas (combustible gas) in the carbonization-water gasification furnaces 201 to 250, . . . , a pipe 2in for sending the dry distillation gas from the dry distillation gas tank 1400 storing the dry distillation gas collected from the pipe 2out through the pressure pump 1100 and the heat collection apparatus 1300 to the heating furnaces 101, 102 to 151, . . . , a pipe (water gas collection pipe) 3 for collecting the water gas generated in the carbonization-water gasification furnaces 201 to 250, . . . , a pipe 4 for sending steam (high-temperature steam) to be injected under pressure into the carbonization-water gasification furnaces 201 to 250, . . . for the water gasification reaction, a pipe 5 for blowing pressurized air into the carbonization-water gasification furnaces 201 to 250, . . . , and a pipe 6 for blowing air sent from the pressure pump 1200 into the heating furnaces 101, 102 to 151, . . . .

The bio-multi-reactor hydrogen generation system 1000 includes opening and closing valves 11 to 19. The opening and closing valves 11 adjust the exhaust gas flow rate after the dry distillation gas (combustible gas) is combusted in the heating furnaces 101, 102 to 151, . . . and during the operation, the opening and closing valves 11 are kept open most of the time. The opening and closing valves 12 are closed when the dry distillation gas no longer comes out of the carbonization-water gasification furnaces 201 to 250, . . . . The opening and closing valves 13 are opened when steam is supplied. The opening and closing valves 14 adjust the flow rate when the dry distillation gas is supplied to the heating furnaces 101, 102 to 151, The opening and closing valves 15 are closed during the dry distillation of the carbonization-water gasification furnaces 201 to 250, . . . to prevent the dry distillation gas from flowing out and opened when the water gas is taken out after the dry distillation is completed. The opening and closing valves 16 are opened when steam is supplied to the top of the carbonization-water gasification furnaces 201 to 250, . . . during dry distillation. The opening and closing valves 17 are opened when steam is supplied to the bottom part of the carbonization-water gasification furnaces 201 to 250, for the water gasification reaction. The opening and closing valves 18 are opened when air is blown into the furnace in a case where the temperature of the carbonization-water gasification furnaces 201 to 250, . . . drops considerably below 400 to 500° C. The opening and closing valves 19 control the flow rate of the pressurized air for adjusting the combustion situation in the heating furnaces 101, 102 to 151, . . . .

The carbonization-water gasification furnaces 201 to 250, . . . are filled with solid combustibles, such as biomass chips and small branches, and in addition thereto, a catalyst as needed from the top thereof, or they are supplied to or arranged in the carbonization-water gasification furnaces 201 to 250, . . . from the top thereof. Large solid combustibles, such as bamboo and logs having a length of 10 meters or more, may be inserted, supplied, or arranged from the lateral side or the top of the furnace. The solid combustibles are subjected to dry distillation with high-temperature heating from the heating furnaces 101, 102 to 151, adjacent to the carbonization-water gasification furnaces 201 to 250, . . . . Then, when the dry distillation gas is no longer generated with the heat from the heating furnaces 101, 102 to 151, . . . , steam is injected under pressure into the carbonization-water gasification furnaces 201 to 250, . . . . Into the carbide obtained by the dry distillation of the carbonization-water gasification furnaces 201 to 250, . . . , high-temperature steam through the top of the heating furnaces 101, 102 to 151, . . . is blown so that the water gasification reaction takes place and thereby the carbide is gasified. All the carbide obtained by the dry distillation is water gasified and supplied to the next apparatus. The dry distillation gas (combustible gas) is used as the fuel of the heating furnaces 101, 102 to 151, . . . . The dry distillation gas generated in the carbonization-water gasification furnaces 201 to 250, . . . is collected in the dry distillation gas tank 1400 and the dry distillation gas is supplied to the heating furnaces 101, 102 to 151, . . . for combustion and the temperature of the heating furnaces 101, 102 to 151, . . . is maintained at the temperature at which the solid combustibles are subjected to dry distillation. The temperature of the exhaust gas is high, and therefore, as depicted in FIG. 4, in addition to the use for power generation by utilizing the exhaust gas to generate high-temperature steam by the boiler 2000, it is made easy to collect heat by the reboiler 2200 or the like by applying pressure by the pressure pump 2100. It is possible to utilize the exhaust gas as the heat source of the biomass drying 2500 and the greenhouse cultivation heating 2600 also after heat is collected. Oxygen contained in the exhaust gas is reduced, and therefore, the change in quality of biomass may be less. Even if the chimney 2700 for discharging gas is low, it is possible to sufficiently diffuse the exhaust gas.

The heating furnaces 101, 102 to 151, and the carbonization-water gasification furnaces 201 to 250, are arranged alternately side by side. The dry distillation gas collected from each carbonization-water gasification furnace is collected in the dry distillation gas tank 1400 by using the heat collection apparatus 1300 after applying pressure by the pressure pump 1100 and then, the dry distillation gas is supplied to each of the heating furnaces 101, 102 to 151, . . . and utilized as the combustion gas. Although pressurization may be omitted, pressurization will make smooth the flow of the combusted gas and improve the heat collection rate. The combustible gas is supplied to the heating furnaces 101, 102 to 151, . . . from the outside only at the time of startup, but normally, it is possible for the heating furnaces 101, 102 to 151, . . . to operate on the dry distillation gas alone and depending on the biomass and coal to be supplied and the operation condition, the dry distillation gas will be excessive.

Generally, the heating furnaces 101, 102 to 151, are constructed of fire-resistant bricks, but when it is possible to operate the heating furnaces 101, 102 to 151, . . . at temperatures less than or equal to 1,000° C., they may be constructed of heat-resistant steel. The carbonization-water gasification furnaces 201 to 250, . . . are operated at temperatures less than or equal to 1,000° C., and therefore, they may be constructed of heat-resistant steel.

Figure 2:
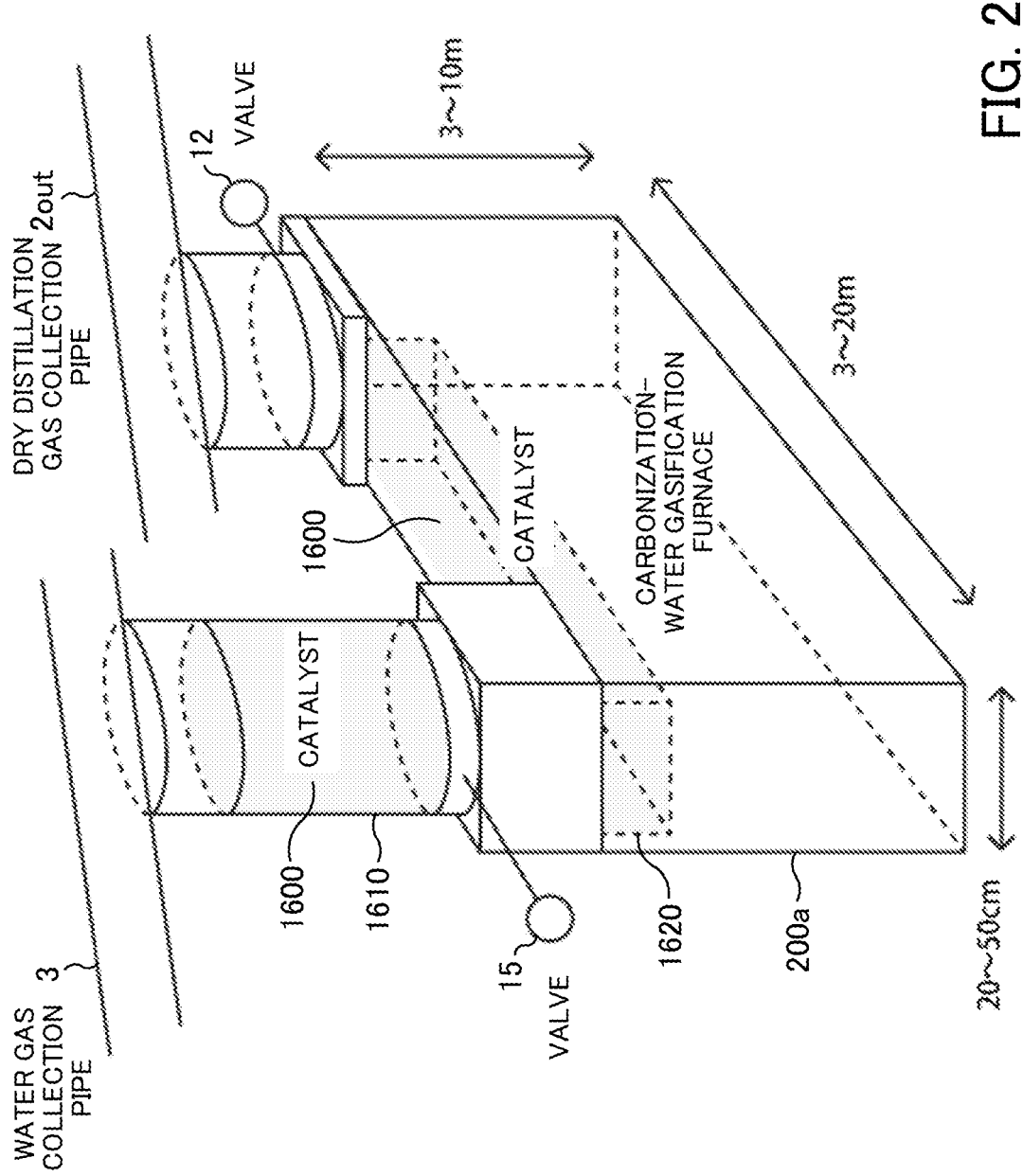
FIG. 2 is an explanatory diagram of sizes of a carbonization-water gasification furnace and portions in which catalysts are arranged.

The carbonization-water gasification furnaces 201 to 250, . . . are described with reference to FIG. 2. In FIG. 2, one of the carbonization-water gasification furnaces 201 to 250, is depicted as a carbonization-water gasification furnace 200a. The inner width of the furnace is set to 0.20 m to 1.0 m, preferably, 0.20 m to 0.50 m. Greater width may be accepted, but less width is more effective for heat conduction at the time of dry distillation. The length of the furnace is set to 3 m to 20 m. The greater the length, the more the volume of production may be increased, but the more difficult it becomes to keep uniform the temperature inside the furnace and the more time and effort the maintenance inspection will take. The height of the furnace is set to 3 m to 10 m. For the same reason as in the case of length, it is preferable not to set the height too great. It is possible fill a pipe 1610 that connects the furnace to the pipe (water gas collection pipe) 3, which is the main pipe for water gas collection, with or arrange a catalyst 1600, that is, a shift reaction catalyst or a reverse shift reaction catalyst therein, or install a breathable container 1620 on the uppermost portion of the furnace and fill the container 1620 with or arrange the catalyst 1600 therein. The shift reaction catalyst is a catalyst for making it easy to oxidize the carbon monoxide in the dry distillation gas to carbon dioxide. The reverse shift reaction catalyst is a catalyst for making it easy to reduce the carbon dioxide in the dry distillation gas to carbon monoxide.

The size of the heating furnaces 101, 102 to 151, . . . is also substantially the same as that of the carbonization-water gasification furnaces 201 to 250, . . . . The inner width of the furnaces is set to 0.20 m to 0.80 m, preferably, 0.20 m to 0.50 m. If the inner width is too great, the heating efficiency decreases. The length of the furnaces is set to 3 m to 20 m. The greater the length, the more the volume of production may be increased, but the more difficult it becomes to keep uniform the temperature inside the furnaces and the more time and effort the maintenance inspection will take. The height of the furnaces is set to 3 m to 10 m. For the same reason as in the case of length, it is preferable not to set the height too great.

Figure 3:
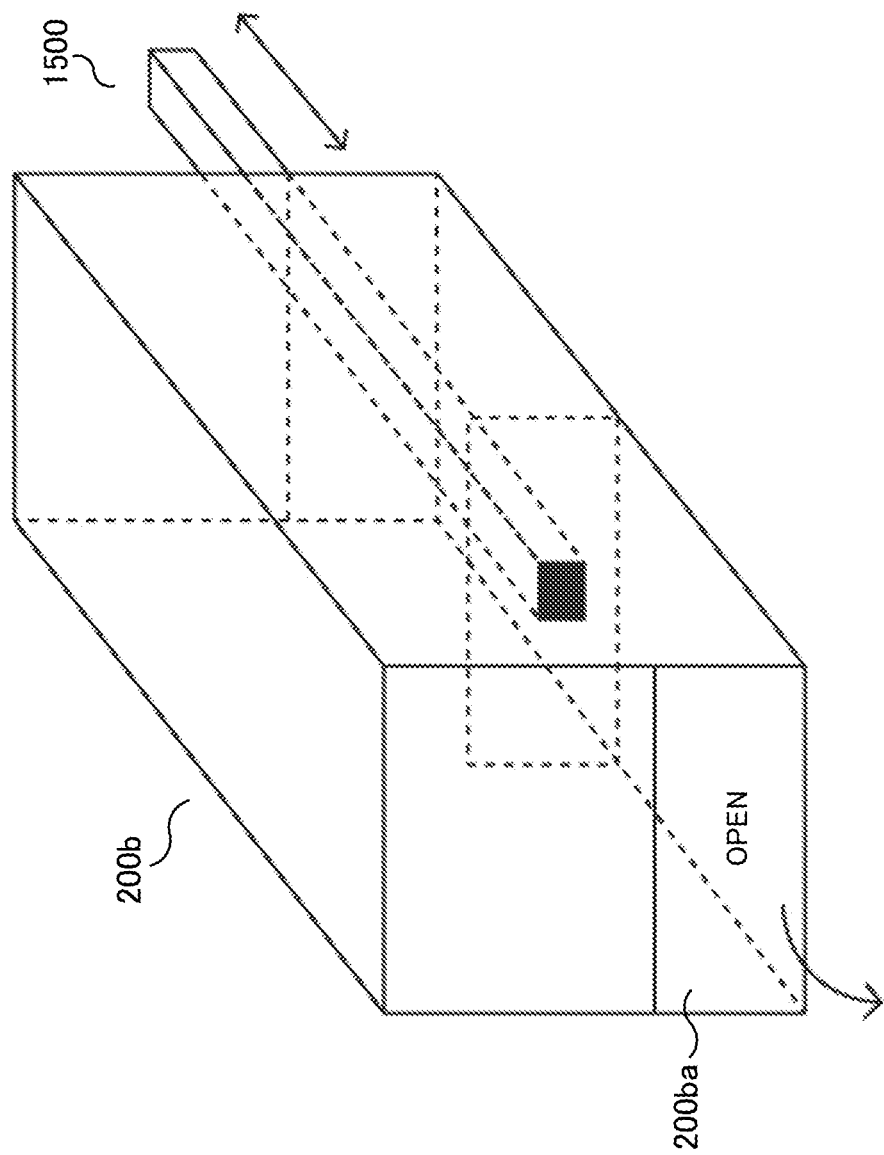
FIG. 3 is an explanatory diagram of a mechanism of pushing out ash.

It is possible to prevent soot, tar and the like having stuck to the furnace wall and the like during the dry distillation of solid combustibles (biomass and coal) from remaining within the carbonization-water gasification furnaces 201 to 250, . . . by providing steam blowing pipes in two or more upper and lower rows in each carbonization-water gasification furnace 201 to 250, . . . and water gasifying the soot, tar and the like with high-temperature steam. Further, when the carbonization-water gasification furnaces 201 to 250, . . . are filled with or by arranging a catalyst, biomass (mainly bamboo and trees), and coal therein and water gasification is repeated several times, ash and the catalyst accumulate, and therefore, the ash and catalyst are discharged to the outside by pushing out them, and so on. As one example, a mechanism of pushing out accumulated ash is depicted in FIG. 3. In FIG. 3, one of the carbonization-water gasification furnaces 201 to 250, . . . is depicted as a carbonization-water gasification furnace 200b. A part 200ba of the carbonization-water gasification furnace 200b is opened and accumulated ash is pushed out to the outside by using a rod 1500.

By selecting a catalyst and the amount of steam to be injected under pressure, it is possible to control the ratio between carbon monoxide and carbon dioxide in the water gas.

As above, with the present bio-multi-reactor hydrogen generation method and system, it is possible to efficiently utilize solid combustibles, such as biomass (mainly bamboo and trees) ranging from a large-sized log to a small-sized pellet, coal and the like. With the present bio-multi-reactor hydrogen generation method and system, hydrogen is generated by causing the majority of carbon that remains after dry distillation to react with water, and therefore, the amount of heat is large as compared with the combustion of carbon alone, such as coke.

According to NPTL3, the combustion of carbon is expressed by chemical equation (1) below.

$$C+O_2=CO_2-94.0 \text{ kcal} \quad (1)$$

The generation of hydrogen by decomposition of water with carbon is expressed by chemical equation (2) below.

$$C+2H_2O=CO_2+2H_2+21.6 \text{ kcal} \quad (2)$$

If the heat of combustion of hydrogen is found from two chemical equations (1) and (2), the left side and the right side of each of chemical equations (1) and (2) are equal, and therefore, the results of the addition of the left side of chemical equation (1) and the right side of chemical equation (2) are equal to the results of the addition of the right side of chemical equation (1) and the left side of chemical equation (2). Consequently, chemical equation (3a) below is obtained.

$$C+O_2+CO_2+2H_2+21.6 \text{ kcal}=CO_2-94.0 \text{ kcal}+C+2H_2O \quad (3a)$$

If C and $CO_2$ are eliminated from both sides in chemical equation (3a), chemical equation (3b) below is obtained.

$$O_2+2H_2+21.6 \text{ kcal}=2H_2O-94.0 \text{ kcal} \quad (3b)$$

Consequently, the heat of combustion of hydrogen is expressed by chemical equation (3c) below.

$$2H_2+O_2=2HO_2-105.6 \text{ kcal} \quad (3c)$$

Two hydrogen molecules are generated from one carbon molecule, and therefore, it is meant that the generated hydrogen has the heat of combustion 20% or more larger than the heat of combustion of carbon.

With the present bio-multi-reactor hydrogen generation method and system, it is also possible to utilize biomass (mainly bamboo and trees) ranging from a large-size log to a small-sized pellet, and therefore, the present bio-multi-reactor hydrogen generation method and system may be a key solution to the zero emissions of carbon dioxide. Even if inexpensive coal is used, coal contains sulfur compounds and nitrogen compounds, and therefore, the apparatus for removing them is indispensable. With the present bio-multi-reactor hydrogen generation method and system, the load to remove sulfur compounds and nitrogen oxide is lightened, as compared with the gasification and combustion of all coal, and therefore, the industrial value in use is high.

In addition, the temperature of the water gas from the carbonization-water gasification furnace is 400° C. or more and the reaction temperature of methanol synthesis may be 300° C. or less, and therefore, heating of the material gas is no longer needed (NPTL5). Even if the gas coming out of the carbonization-water gasification furnace is utilized for power generation by heating steam by a heat exchanger or the like, it is still possible to maintain the sufficient reaction temperature. Consequently, it becomes possible to effectively use heat and the possibility that the production cost is further reduced is strong.

Methanol synthesis that utilizes carbon monoxide is expressed by chemical equation (4) below.

$$CO+2H_2=CH_3OH-91.0 \text{ kJ (exothermic)} \quad (4)$$

In contrast to this, methanol synthesis that utilizes carbon dioxide is expressed by chemical equation (5) below.

$$CO_2+3H_2=CH_3OH+H_2O-49.8 \text{ kJ (exothermic)} \quad (5)$$

The methanol synthesis that utilizes carbon dioxide needs more hydrogen, and therefore, the price of hydrogen greatly affects the price of methanol.

With the present bio-multi-reactor hydrogen generation method and system, $H_2O$ is decomposed with carbon, and therefore, the amount of CO or $CO_2$ included in the generated gas depends on the condition (presence/absence of steam, catalyst and the like). Separation of impurities is not needed, and therefore, it may also be possible to send the water gas directly to the methanol synthesis process depending on the methanol synthesis condition. With the present bio-multi-reactor hydrogen generation method and system, it is possible to perform power generation by utilizing the needed heat for generating steam, and therefore, the possibility that the cost of the methanol synthesis is lowered is strong.

Methanol has been utilized as the fuel in the F1 race and if the price of methanol is lowered, it is possible to utilize methanol as the alternative fuel of gasoline.

All examples and conditional language provided herein are intended for the pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although one or more embodiments of the present disclosure have been described in detail, it should be understood that various changes, substitutions, and alterations could be made hereto without departing from the spirit and scope of the disclosure.

What is claimed is:

1. A bio-multi-reactor hydrogen generation method using a bio-multi-reactor hydrogen generation apparatus including a plurality of carbonization-water gasification furnaces and a plurality of heating furnaces arranged alternately side by side, the method comprising:
    arranging solid combustibles in each of the carbonization-water gasification furnaces;
    dry distilling the solid combustibles by heating from each of the heating furnaces adjacent to each of the carbonization-water gasification furnaces;
    gasifying carbon obtained by dry distillation within each of the carbonization-water gasification furnaces by supplying steam to the carbon to cause a water gasification reaction to take place; and
    maintaining each of the heating furnaces at a temperature for dry distilling the solid combustibles in each of the carbonization-water gasification furnaces by collecting a combustible gas generated in the dry distilling of the solid combustibles in each of the carbonization-water gasification furnaces in a tank and supplying the combustible gas to each of the heating furnaces for combustion.

2. The bio-multi-reactor hydrogen generation method according to claim 1, wherein
    the gasifying of the carbon includes gasifying the carbon into a water gas containing carbon monoxide.

3. The bio-multi-reactor hydrogen generation method according to claim 1, wherein
    the solid combustibles and a catalyst are arranged in each of the carbonization-water gasification furnaces.

4. The bio-multi-reactor hydrogen generation method according to claim 3, wherein
    a shift reaction catalyst for oxidizing carbon monoxide to carbon dioxide is arranged as the catalyst within a breathable container installed at a top of each of the carbonization-water gasification furnaces.

5. The bio-multi-reactor hydrogen generation method according to claim 3, wherein
    a shift reaction catalyst for oxidizing carbon monoxide to carbon dioxide is arranged as the catalyst within a pipe connecting each of the carbonization-water gasification furnaces to a water gas collection pipe collecting a water gas generated by the water gasification reaction.

6. The bio-multi-reactor hydrogen generation method according to claim 3, wherein
    a reverse shift reaction catalyst for reducing carbon dioxide to carbon monoxide is arranged as the catalyst within a breathable container installed at a top of each of the carbonization-water gasification furnaces.

7. The bio-multi-reactor hydrogen generation method according to claim 3, wherein
    a reverse shift reaction catalyst for reducing carbon dioxide to carbon monoxide is arranged as the catalyst within a pipe connecting each of the carbonization-water gasification furnaces to a water gas collection pipe collecting a water gas generated by the water gasification reaction.

8. The bio-multi-reactor hydrogen generation method according to claim 1, further comprising
    performing power generation using heat generated in each of the heating furnaces and power generation utilizing heat generated in each of the heating furnaces by repeatedly performing heat collection or using heat generated in each of the carbonization-water gasification furnaces.

9. The bio-multi-reactor hydrogen generation method according to claim 1, wherein
    soot or tar having stuck to an inside of each of the carbonization-water gasification furnaces during the dry distilling of the solid combustibles is water gasified by steam blown from steam blowing pipes in two or more upper and lower rows installed in each of the carbonization-water gasification furnaces.

10. A bio-multi-reactor hydrogen generation method using a bio-multi-reactor hydrogen generation system including a plurality of carbonization-water gasification furnaces and a plurality of heating furnaces arranged alternately side by side, the method comprising:
    arranging biomass of different sizes or coal, which are solid combustibles, and a water gasification catalyst in each of the carbonization-water gasification furnaces;
    dry distilling the solid combustibles by heating from each of the heating furnaces adjacent to each of the carbonization-water gasification furnaces;
    gasifying carbon obtained by the dry distilling within each of the carbonization-water gasification furnaces into a water gas containing carbon monoxide by blowing steam through a top of each of the heating furnaces into the carbon to cause a water gasification reaction to take place;
    increasing reaction speed at which the water gas is generated by the water gasification catalyst;
    maintaining each of the heating furnaces at a temperature for dry distilling the solid combustibles in each of the carbonization-water gasification furnaces by collecting a combustible gas generated in the dry distilling of the solid combustibles in each of the carbonization-water gasification furnaces in a tank and supplying the combustible gas to each of the heating furnaces for combustion; and
    gasifying soot or tar having stuck to an inside of each of the carbonization-water gasification furnaces during the dry distilling of the solid combustibles by steam blown from steam blowing pipes in two or more upper and lower rows installed in each of the carbonization-water gasification furnaces.

* * * * *